United States Patent [19]
Ogino et al.

[11] Patent Number: 5,700,296
[45] Date of Patent: Dec. 23, 1997

[54] AZO COMPOUND AND A POLARIZING FILM CONTAINING THE SAME

[75] Inventors: Kazuya Ogino, Minoo; Kaneo Yokoyama, Nara; Narutoshi Hayashi, Niihama; Takashi Omura, Kobe; Setsuko Yamamoto, Toyonaka, all of Japan

[73] Assignee: Sumitomo Chemical Company, Limited, Osaka, Japan

[21] Appl. No.: 603,107

[22] Filed: Feb. 20, 1996

[30] Foreign Application Priority Data

Feb. 20, 1995 [JP] Japan ..................... 7-030902
Nov. 28, 1995 [JP] Japan ..................... 7-309339

[51] Int. Cl.$^6$ .......................... C09B 31/068; G02B 5/30; D06P 3/00
[52] U.S. Cl. .................. 8/489; 8/506; 8/681; 8/685; 8/687; 534/683; 534/684; 534/685; 534/688; 534/678; 534/666; 534/671; 534/827; 534/714; 534/716; 252/585; 359/491
[58] Field of Search ................. 534/683–85, 688, 534/678, 666, 671, 714, 716, 827; 252/585; 359/491; 428/1; 8/489, 506, 681–687

[56] References Cited

U.S. PATENT DOCUMENTS

| | | |
|---|---|---|
| 4,514,559 | 4/1985 | Sato et al. . |
| 5,310,509 | 5/1994 | Okada et al. ............... 252/585 |
| 5,354,512 | 10/1994 | Ogino et al. ............... 252/585 |
| 5,480,977 | 1/1996 | Ogino et al. ............... 534/717 |

FOREIGN PATENT DOCUMENTS

| | | |
|---|---|---|
| 342241 | 11/1989 | European Pat. Off. . |
| 530106 | 3/1993 | European Pat. Off. . |
| 593324 | 4/1994 | European Pat. Off. . |
| 648814 | 4/1995 | European Pat. Off. . |
| 01252904 | 3/1988 | Japan . |
| 06128498 | 10/1992 | Japan . |
| 06122830 | of 1993 | Japan . |
| 06337312 | 5/1993 | Japan . |

OTHER PUBLICATIONS

Chemical Abstracts Service Registry Handbook Number Section 1979 Supplement Title Page With Printout of Structure from Search of 26 Sep. 1996.

*Primary Examiner*—Margaret Einsmann
*Attorney, Agent, or Firm*—Watson Cole Stevens Davis, PLLC

[57] ABSTRACT

An azo compound of the following formulae (I) or (II):

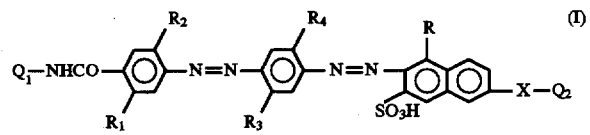

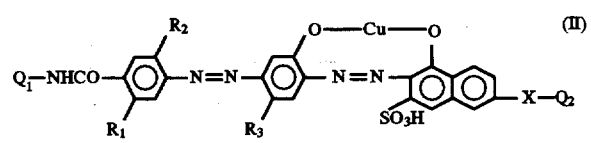

wherein $Q_1$ represents a phenyl group or a naphthyl group, $Q_2$ represents a phenyl group; R represents hydroxy group; $R_1$ and $R_2$ each independently represent a hydrogen atom, a hydroxy group, a $C_1$–$C_4$ alkyl group, a $C_1$–$C_4$ alkoxy group or a halogen atom; $R_3$ and $R_4$ each independently represent a hydrogen atom, a hydroxy group, a $C_1$–$C_4$ alkyl group, a $C_1$–$C_4$ alkoxy group or a substituted amino group; and X represents —NH—, —NHCO— or —N=N—; or a salt thereof;

and a polarizing film containing the same.

26 Claims, No Drawings

AZO COMPOUND AND A POLARIZING FILM CONTAINING THE SAME

The present invention relates to an azo compound useful as a dye, particularly as a dye for a polarizing film and a polarizing film containing the same.

Polarizing films have been generally produced by incorporating iodine or a dichromatic dye as a polarizing element into an oriented film made of polyvinyl alcohol or its derivatives, or into an oriented polyene film prepared by a dehydro chlorination of a polyvinyl chloride film or by a dehydration of a polyvinyl alcohol film so as to produce polyene in the film, followed by the orientation of the resulting film.

Among those, an iodine-containing polarizing film is superior in early stage polarizing activities, but poor in the durability to moisture and heat. Thus, the film has some drawbacks in the lowered polarizing activities after having been used for a certain period of time at a high temperature under a highly humid condition. Several methods for improving the durability have been proposed, in which the film is treated with formalin or an aqueous boric acid solution, or a polymer film having a low moisture permeability is employed as a protecting film. However, these methods are not yet fully satisfactory.

A dye-containing polarizing film using a dichromatic dye as a polarizing element is superior in the durability to moisture and heat as compared with an iodine-containing polarizing film, but, generally, is inferior in the early stage polarizing activities.

If two polarizing films of neutral color containing two or more kinds of dichromatic dyes are superposed on each other so that those orientation directions meet at right angles (hereinafter, this state is referred to as "crossed state") and the set of two polarizing films is pervious to light of a specific wave length within the visible radiation wavelength region, particularly from 400 to 700 nm, a liquid crystal display using the two films often shows a color different from the intended color at dark state.

JP-A-59-145255 discloses a polarizing film containing a water soluble bisazo compound represented by the following structure:

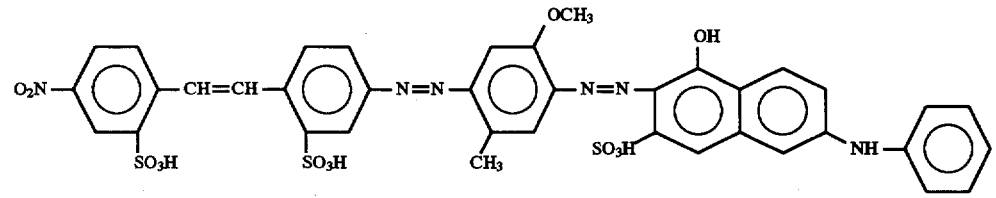

but the polarizing film does not yet fully satisfy properties demanded by users such as durability, polarizing activities, ability to prevent breaking of light through films at crossed state over the visible radiation wavelength region, or the like.

The present inventors have extensively studied to find out a compound which can give a polarizing film containing the same excellent polarizing activities, durability and the like, and have found that using a specific azo compound is effective to accomplish these objects. They have also found that a polarizing film containing the specific azo compound together with another specific dye used for making the polarizing film neutral color is not only excellent in polarizing activities and durability under high temperature and high humid conditions but also is little pervious to light at crossed state over the visible radiation wavelength region. Thus, the present invention was accomplished.

The present invention provides an azo compound represented by the following formula (I) or (II):

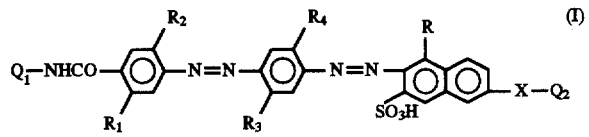

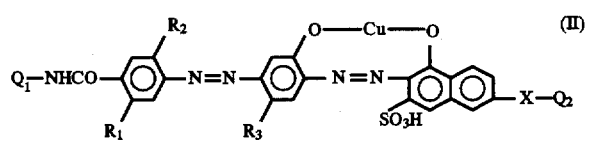

wherein $Q_1$ represents a substituted or unsubstituted phenyl group or a substituted or unsubstituted naphthyl group, $Q_2$ represents a substituted or unsubstituted phenyl group; R represents hydroxy group; $R_1$ and $R_2$ each independently represent a hydrogen atom, a hydroxy group, a $C_1$–$C_4$ alkyl group, a $C_1$–$C_4$ alkoxy group or a halogen atom; $R_3$ and $R_4$ each independently represent a hydrogen atom, a hydroxy group, a $C_1$–$C_4$ alkyl group, a $C_1$–$C_4$ alkoxy group or a substituted amino group; and X represents —NH—, —NHCO— or —N=N—; or a salt thereof (Hereinafter, the azo compound of formula (I), the azo compound of formula (II) and a salt thereof are referred to as "azo compound I").

The present invention also provides a dye-containing polarizing film containing an azo compound I and another organic dye in a polarizing film substrate.

A phenyl group represented by the following formula:

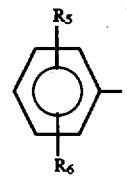

wherein $R_5$ and $R_6$ each independently represent a hydrogen atom, a sulfo group, a sulfamoyl group, a $C_1$–$C_4$ alkyl group, a $C_1$–$C_4$ alkoxy group, a substituted amino group, a carboxy group or a halogen atom is preferred as the unsubstituted or substituted phenyl group denoted by $Q_1$ in the formulas (I) or (II). Among them, particularly preferred is a phenyl group substituted by a sulfo group, a sulfamoyl group, a methyl group, an ethyl group, a methoxy group, an ethoxy group, a carboxy group or a chlorine atom.

A naphthyl group represented by the following formula:

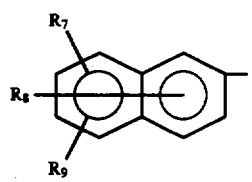

wherein $R_7$, $R_8$ and $R_9$ each independently represent a hydrogen atom, a hydroxy group or a sulfo group is preferred as the unsubstituted or substituted naphthyl group denoted by $Q_1$ in the formulas (I) or (II). Among them, particularly preferred is a naphthyl group substituted by one or two sulfo groups.

When X is —N=N—, preferred examples as the phenyl group denoted by $Q_2$ in formulae (I) or (II) include a phenyl group which is substituted once, twice or three times by hydroxy groups, and which may be further substituted by an unsubstituted amino group, a substituted amino group, a sulfo group, a $C_1$–$C_4$ alkyl group, a $C_1$–$C_4$ alkoxy group or a carboxy group; and a phenyl group which is substituted once or twice by unsubstituted or substituted amino groups, and which may be further substituted by one or two substituents selected from a hydroxy group, a sulfo group, a $C_1$–$C_4$ alkyl group, a $C_1$–$C_4$ alkoxy group or a carboxy group. Among the above, a particularly preferred example of the phenyl group denoted by $Q_2$ is 4-hydroxyphenyl.

When X is —NHCO— or —NH—, preferred examples as the phenyl group denoted by $Q_2$ in formulae (I) or (II) include an unsubstituted phenyl group and a phenyl group substituted by a hydroxy group, an unsubstituted amino group, a substituted amino group, a sulfo group or a $C_1$–$C_4$ alkoxy group.

When the phenyl group denoted by $Q_2$ is substituted by a substituted amino group, the amino group may be mono- or di-substituted and the substituents on the amino group are preferably methyl, ethyl, β-hydroxyethyl, β-cyanoethyl, acetyl, carbamoyl or methylsulfonyl.

Preferred examples of $R_1$ or $R_2$ in formulae (I) or (II) include a hydrogen atom, a methyl group, a methoxy group, a hydroxy group and a chlorine atom. Preferred examples of $R_3$ or $R_4$ in formulae (I) or (II) include a hydrogen atom, a hydroxy group, a methyl group, an ethyl group, a methoxy group, an ethoxy group and an acetylamino group.

When $R_3$ or $R_4$ represents a substituted amino group, the amino group may be mono- or di-substituted and the substituents are preferably methyl, ethyl, acetyl, carbamoyl or methylsulfonyl.

Azo compound I of the formula (I) can be produced, for example, according to the following method.

A compound represented by the following formula (III):

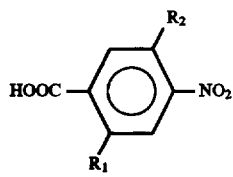

wherein $R_1$ and $R_2$ are as hereinbefore defined is subjected to a known acid chlorination reaction to obtain a compound represented by the following formula (IV):

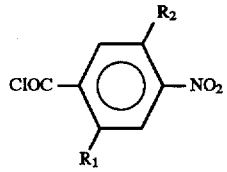

wherein $R_1$ and $R_2$ are as hereinbefore defined. The compound of formula (IV) thus obtained is allowed to react with a compound represented by the formula (V):

$$Q_1-NH_2 \quad (V)$$

then the resulting compound is subjected to a reduction to obtain a compound represented by the following formula (VI):

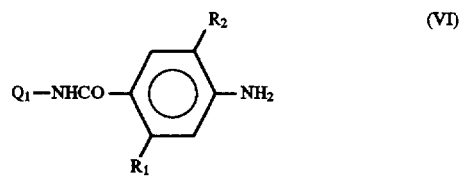

wherein $Q_1$, $R_1$ and $R_2$ are as hereinbefore defined. Thereafter, the compound of formula (VI) is subjected to a diazotization and, then, the diazo compound thus obtained is subjected to a coupling reaction with a compound represented by the following formula (VII):

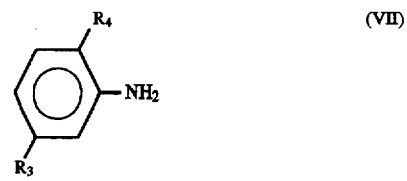

wherein $R_3$ and $R_4$ are as hereinbefore defined or with an ω-methane sulfonated derivative thereof. The coupled compound is hydrolyzed, if necessary, and, thereafter, is diazotized according to a conventional method, followed by coupling with a compound represented by the following formula (VIII):

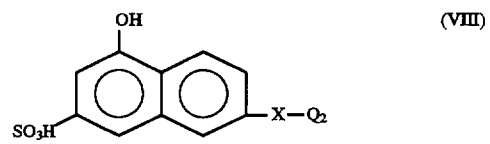

wherein X and $Q_2$ are as hereinbefore defined to obtain azo compound I. The compound of formula (VIII) wherein X is —N=N— can be easily obtained by diazotizing a compound represented by the following formula (IX):

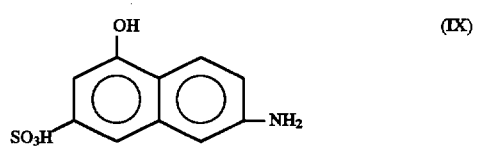

according to a known method, followed by coupling with a compound represented by the formula "$Q_2$—H" wherein $Q_2$ is as hereinbefore defined.

Azo compound I of the formula (II) can be obtained by conducting the same procedure as mentioned above except that the compound of formula (VII) is replaced by a compound represented by the following formula (XI):

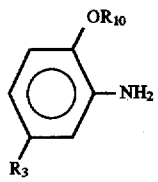

wherein $R_{10}$ represents a hydrogen atom or a methyl group and $R_3$ is as hereinbefore defined or an ω-methane sulfonated derivative thereof to obtain an azo compound, followed by reacting the azo compound, thus obtained to form a copper complex salt thereof according to a conventional method. An azo compound I of formula (I) wherein $R_4$ is a hydroxy group can be obtained from azo compound I of formula (II) (=copper complex salt) by subjecting the azo compound I of formula (II) to a conventional demetalization such as a demetalization by using a chelating agent such as ethylenediamine tetraaceticacid.

Examples of the compound of formula (III) include 4-nitrobenzoic acid, 4-nitro-3-hydroxy benzoic acid, 4-nitro-3-methyl benzoic acid, 4-nitro-3-methoxy benzoic acid, 4-nitro-2,5-dimethyl benzoic acid, and 4-nitro-2-chloro benzoic acid.

Examples of the compound of formula (V) include aniline, 2-aminobenzene sulfonic acid, 3-aminobenzene sulfonic acid, 4-aminobenzene sulfonic acid, 5-aminobenzene-1,3-disulfonic acid, 6-aminobenzene- 1,4-disulfonic acid, 4-aminobenzene-1,2-disulfonic acid, 2-sulfamoyl aniline, 3-sulfamoyl aniline, 4-sulfamoyl aniline, 2-aminobenzoic acid, 3-aminobenzoic acid, 4-aminobenzoic acid, 2-chloroaniline, 3-chloroaniline, 4-chloroaniline, 2,5-dichloroaniline, 2-bromoaniline, 3-bromoaniline, 4-bromoaniline, 2-methylaniline, 3-methylaniline, 4-methylaniline, 2-ethylaniline, 3-ethylaniline, 4-ethylaniline, 2-methoxyaniline, 3-methoxyaniline, 4-methoxyaniline, 2-ethoxyaniline, 3-ethoxyaniline, 4-ethoxyaniline, 4-di(β-hydroxyethyl)aminoaniline, 1-aminonaphthalene-4-sulfonic acid, 1-aminonaphthalene-5-sulfonic acid, 1-aminonaphthalene-6-sulfonic acid, 1-aminonaphthalene-7-sulfonic acid, 1-aminonaphthalene-8-sulfonic acid, 2-aminonaphthalene-1-sulfonic acid, 2-aminonaphthalene-5-sulfonic acid, 2-aminonaphthalene-6-sulfonic acid, 2-aminonaphthalene-7-sulfonic acid, 2-aminonaphthalene-8-sulfonic acid, 1-aminonaphthalene-4,7-disulfonic acid, 1-aminonaphthalene-4,6-disulfonic acid, 1-aminonaphthalene-3,7-disulfonic acid, 1-aminonaphthalene-3,8-disulfonic acid, 1-aminonaphthalene-3,6-disulfonic acid, 2-aminonaphthalene-4,8-disulfonic acid, 2-aminonaphthalene-6,8-disulfonic acid, 2-aminonaphthalene-3,6-disulfonic acid, 2-aminonaphthalene-1,5-disulfonic acid, 2-aminonaphthalene-5,7-disulfonic acid, 1-aminonaphthalene-3,6,8-trisulfonic acid, 2-aminonaphthalene-3,6,8-trisulfonic acid, 2-aminonaphthalene-4,6,8-trisulfonic acid, 2-aminonaphthalene-5-hydroxy-7-sulfonic acid, and 2-aminonaphthalene-8-hydroxy-6-sulfonic acid.

Examples of the compound of formula (VII) include aniline, 2-methylaniline, 3-methylaniline, 2-ethylaniline, 3-ethylaniline, 2-methoxyaniline, 3-methoxyaniline, 2-ethoxyaniline, 3-ethoxyaniline, 2-hydroxyaniline, 3-hydroxyaniline, 3-acetylamino aniline, 3-carbamoyl amino aniline, 2-methoxy-5-methylaniline, 2-methoxy-5-ethoxyaniline, 2,5-dimethoxyaniline, 2,5-diethoxyaniline, 2-methoxy-5-carbamoyl amino aniline and 2-methoxy-5-methyl sulfonylamino aniline.

Examples of the compound of formula (XI) include 2-hydroxyaniline, 2-methoxy-5-methylaniline, 2-methoxy-5-ethoxyaniline, 2,5-dimethoxyaniline, 2-methoxy-5-carbamoylamino aniline and 2-methoxy-5-methyl sulfonylamino aniline.

When X in the formula (I) or (II) is —NH— or —NHCO—, examples of the compound of formula (VIII) include 1-hydroxynaphthalene-6-phenylamino-3-sulfonic acid, 1-hydroxynaphthalene-6-(4-aminophenyl)amino-3-sulfonic acid, 1-hydroxynaphthalene-6-(4-dimethylaminophenyl)amino-3-sulfonic acid, 1-hydroxynaphthalene-6-(4-methoxyphenyl)amino-3-sulfonic acid, 1-hydroxynaphthalene-6-(4-sulfophenyl)amino-3-sulfonic acid, 1-hydroxynaphthalene-6-benzoylamino-3-sulfonic acid, 1-hydroxynaphthalene-6-(4-aminobenzoyl)amino-3-sulfonic acid, 1-hydroxynaphthalene-6-(3-aminobenzoyl)amino-3-sulfonic acid, 1-hydroxynaphthalene-6-(2-aminobenzoyl)amino-3-sulfonic acid, 1-hydroxynaphthalene-6-(4-hydroxybenzoyl)amino-3-sulfonic acid, 1-hydroxynaphthalene-6-(3-hydroxybenzoyl)amino-3-sulfonic acid, and 1-hydroxynaphthalene-6-(2-hydroxybenzoyl)amino-3-sulfonic acid. Among the above mentioned, 1-hydroxynaphthalene-6-phenylamino-3-sulfonic acid, 1-hydroxynaphthalene-6-benzoylamino-3-sulfonic acid and 1-hydroxynaphthalene-6-(4-aminobenzoyl)amino-3-sulfonic acid are particularly preferred.

When X in the formula (I) or (II) is —N=N—, the compound represented by the formula $Q_2$—H includes, for example, aniline and a derivative thereof, phenol and a derivative thereof, and aminophenol and a derivative thereof. As examples of the compound, aniline, 1,3-diaminobenzene, 1,3-diamino-4-methylbenzene, 1,3-diaminobenzene-4-sulfonic acid, 3-acetylamino aniline, 3-carbamoyl amino aniline, 2-methylaniline, 3-methylaniline, 2-ethylaniline, 3-ethylaniline, 2-methoxyaniline, 3-methoxyaniline, 2-ethoxyaniline, 3-ethoxyaniline, 2-methoxy-5-methyl aniline, 2-methoxy-5-ethoxyaniline, 2,5-dimethoxyaniline, 2-methoxy-5-methylsulfonyl amino aniline, 1-acetylamino-4-methoxy-3-di(β-hydroxyethyl)amino benzene, phenol, resorcinol, phloroglucinol, 2-methylphenol, 3-methylphenol, 4-methylphenol, 2-hydroxy benzoic acid, 2-aminophenol, 3-aminophenol, 5-amino-2-methylphenol, 3-diethylaminophenol and 3-di(β-hydroxyethyl)amino phenol can be mentioned. Among the above-mentioned compounds, phenol is particularly preferred.

Azo compound I may be used in the form of free acid or in the form of salt, such as lithium salt, sodium salt, potassium salt, ammonium salt, ethanolamine salt or alkylamine salt. Preferably, azo compound I is used in sodium salt form.

The polarizing film of-the present invention comprising azo compound I may further comprise other organic dyes to modify the color tone and/or to improve the polarizing activities. Any dyes can be used as the other organic dyes, as long as they have high dichromatic activity and also have the absorption ranges different to those of the azo compound I. For example, dyes listed in Color Index such as C.I. Direct Yellow 12, C.I. Direct Yellow 28, C.I. Direct Yellow 44, C.I. Direct Yellow 142, C.I. Direct Orange 6, C.I. Direct Orange 26, C.I. Direct Orange 39, C.I. Direct Orange 107, C.I. Direct blue 1, C.I. Direct blue 15, C.I. Direct blue 71, C.I. Direct blue 78, C.I. Direct blue 98, C.I. Direct blue 168, C.I. Direct blue 202, C.I. Direct Red 2, C.I. Direct Red 31, C.I. Direct Red 79, C.I. Direct Red 81, C.I. Direct. Red 240, C.I. Direct Red 247, C.I. Direct Brown 106, C.I. Direct Brown 223, C.I. Direct Violet 9, C.I. Direct Violet 51 and C.I. Direct Green 85 can be used.

Preferably, at least two dyes selected from the group [A] and [B] mentioned-below are used as the other dyes, i.e. the dyes to be used together with azo compound I. More preferably, at least one dye selected from the group [A] and at least one dye selected from the group [B] are used as the other dyes. [A]: Trisazo dyes represented by the following formula (IIIa) or (IIIb):

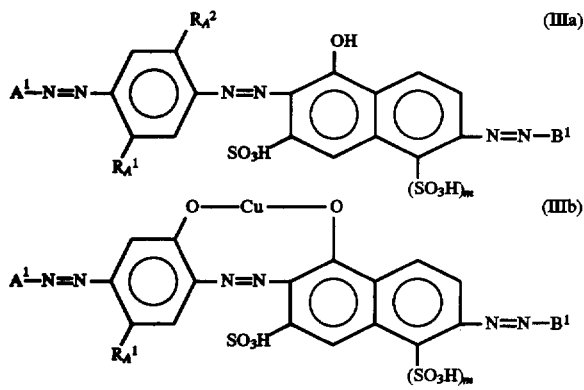

wherein $A^1$ and $B^1$, which are the same or different, each represent a substituted or unsubstituted phenyl group or a substituted or unsubstituted naphthyl group; $RA_A^1$ represents a substituted amino group, a hydrogen atom, a $C_1$–$C_4$ alkyl group or $C_1$–$C_4$ alkoxy group; $R_A^2$ represents a hydrogen atom, a hydroxy group or $C_1$–$C_4$ alkoxy group; and m is 0 or 1, and a salt thereof; [B] C.I. Direct Yellow 12, C.I. Direct Yellow 28, C.I. Direct Yellow 44, C.I. Direct Orange 26, C.I. Direct Orange 39, C.I. Direct Orange 107, C.I. Direct Red 2, C.I. Direct Red 31, C.I. Direct Red 79, C.I. Direct Red 81 and C.I. Direct Red 247.

In formula (IIIa) and (IIIb), $A^1$ and $B^1$ each independently represent a substituted or unsubstituted phenyl, or a substituted or unsubstituted naphthyl. Examples of the substituent of the phenyl group include sulfo, sulfamoyl, nitro, $C_1$–$C_4$ alkyl, $C_1$–$C_4$ alkoxy, carboxy, hydroxy, halogen, unsubstituted amino and substituted amino. Examples of the substituent of the naphthyl group include sulfo, hydroxy, unsubstituted amino and substituted amino. The substituted amino as the above-mentioned substituents may be either mono-substituted amino or disubstituted amino. Examples of the substituent of the amino group include $C_1$–$C_4$ alkyl, $C_1$–$C_4$ alkyl substituted by hydroxy or cyano, alkylcarbonyl wherein the alkyl has 1–4 carbon atoms, phenyl, sulfophenyl, disulfophenyl, benzyl and carbamoyl.

The phenyl group denoted by $A^1$ is preferably that substituted by one or two substituents selected from sulfo, sulfamoyl, nitro, methyl, ethyl, methoxy, ethoxy, carboxy, chlorine, unsubstituted amino or. substituted amino. Particularly preferred as the phenyl group denoted by $A^1$ is sulfophenyl. The naphthyl group denoted by $A^1$ is preferably naphthyl substituted by one, two or three sulfo groups. Particularly preferred as the naphthyl group denoted by $A^1$ is monosulfonaphthyl or disulfonaphthyl.

As the phenyl denoted by $B^1$, one of the following (1) and (2) is preferred:

(1) phenyl which is substituted by one or two amino groups which may be optionally substituted, and may be further substituted by hydroxy, sulfo, $C_1$–$C_4$ alkyl, $C_1$–$C_4$ alkoxy or carboxy, or (2) phenyl which is substituted by one, two or three hydroxy groups, and may be further substituted by amino which may be optionally substituted, sulfo, $C_1$–$C_4$ alkyl, $C_1$–$C_4$ alkoxy or carboxy.

As the naphthyl denoted by $B^1$, one of the following (1) and (2) is preferred:

(1) naphthyl which is substituted by one or two hydroxy groups and which may be further substituted by sulfo, unsubstituted amino or amino substituted by acetyl, phenyl, sulfophenyl, disulfophenyl, benzoyl or methyl, and (2) naphthyl which is substituted once or twice by unsubstituted amino or amino which is substituted by methyl, ethyl, hydoxyethyl, cyanoethyl, acetyl or carbamoyl and which may be further substituted by hydroxy or sulfo.

In formula (IIIa) and (IIIb), $R_A^1$ is hydrogen, $C_1$–$C_4$ alkyl, $C_{1-C4}$ alkoxy or substituted amino. The substituted amino as $R_A^1$ may be either mono-substituted amino or di-substituted amino. Examples of the substituent of the amino include $C_1$–$C_4$ alkyl, alkylcarbonyl wherein the alkyl has 1–4 carbon atoms, $C_1$–$C_4$ alkylsulfonyl and carbamoyl. In formula (IIIa), $R_A^2$ is hydrogen, hydroxy or $C_1$–$C_4$ alkoxy.

Trisazo dyes of group [A], i.e. trisazo dyes of formula (IIIa) or (IIIb) can be produced according to a known process such as a process described in JP-A-2-75672. The known process comprises a conventional diazotization and coupling reaction and, when the dye forms a copper complex salt, it further comprises a formation of copper complex salt.

Preferable examples of the trisazo dye of group [A] include dyes represented by the formulae (IIIa-1)–(IIIa-6) or(IIIb-1)–(IIIb-6) mentioned below and salts thereof.

These dyes are usually used in the form of sodium salt, though they can also be used in the form of free acid, other alkali metal salt such as lithium salt or potassium salt, ammonium salt, or amine salt such as ethanolamine salt or alkylamine salt.

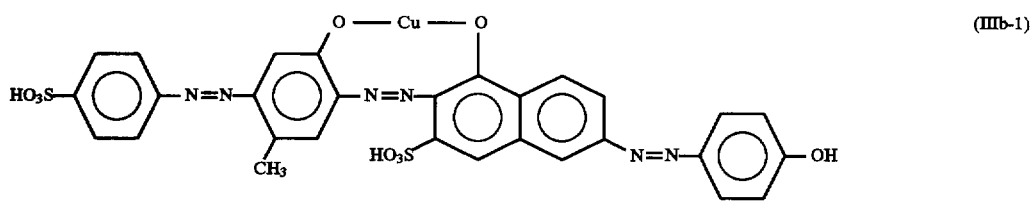

(IIIb-1)

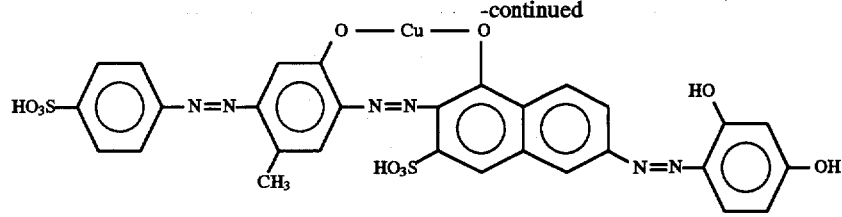
(IIIb-2)
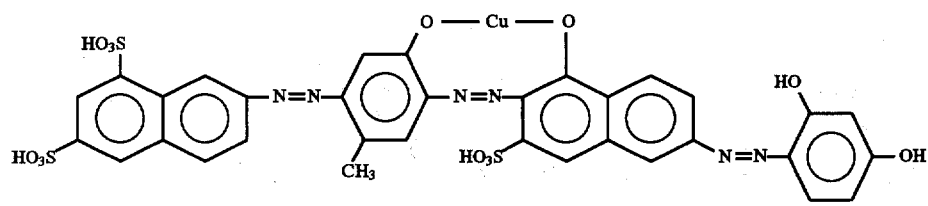
(IIIb-3)
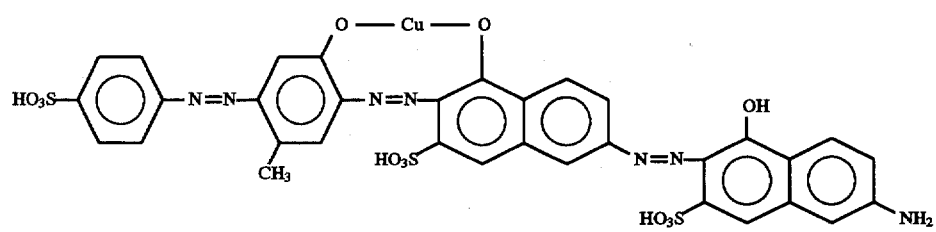
(IIIb-4)
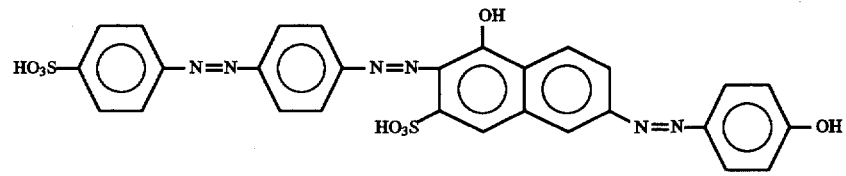
(IIIa-1)
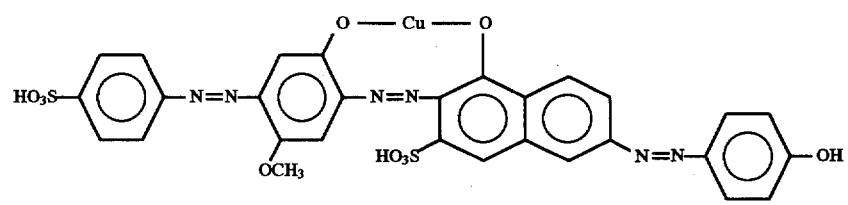
(IIIb-5)
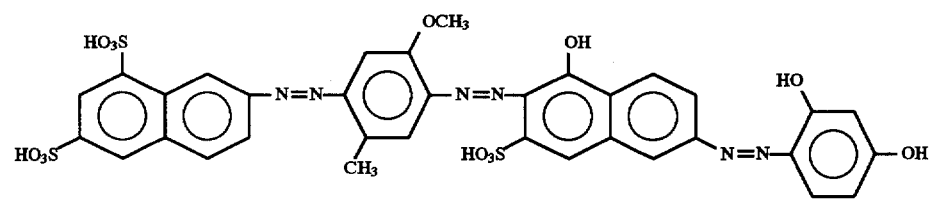
(IIIa-2)
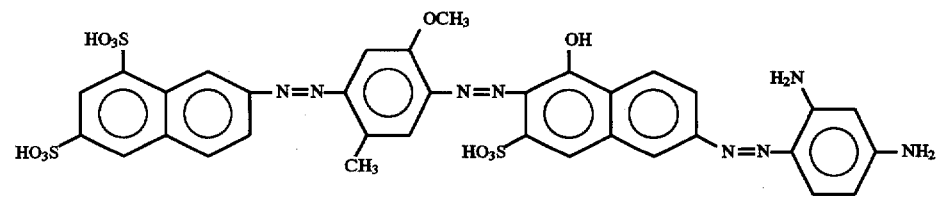
(IIIa-3)
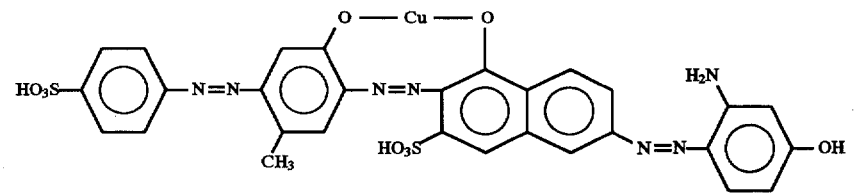
(IIIb-6)
The dyes of group [B] listed in Color Index are commercially available and can be obtained easily. Preferable examples of the dyes of group [B] include following dyes which are on the market by Sumitomo Chemical Co., Ltd., and Color Index Generic Names and trade names of which are also described below:

C.I. Direct Yellow 12 (trade name: Chrysophenine),

C.I. Direct Yellow 28 (trade name: Sumilight Supra Yellow BC conc.),

C.I. Direct Yellow 44 (trade name: Direct Fast Yellow GC),

C.I. Direct Orange 26 (trade name: Direct Fast Orange S),

C.I. Direct Orange 39 (trade name: Sumilight Supra Orange 2GL 125%),

C.I. Direct Orange 107 (trade name: Sumilight Supra Orange GD extra conc.),

C.I. Direct Red 2 (trade name: Benzopurpurine 4B),

C.I. Direct Red 31 (trade name: Nippon Fast. Red BB conc.),

C.I. Direct Red 79 (trade name: Sumilight Supra Red 4BL 170%),

C.I. Direct Red 81 (trade name: Sumilight Red 4B) and

C.I. Direct Red 247 (trade name: Japanol Fast Red FA).

The polarizing film of the present invention can be produced by incorporating dichromatic dyes consisting of azo compound I and, if desired, another organic dye, into a substrate which is a polymer film according to a known method.

When at least two dyes selected from the group [A] and [B] are used in addition to azo compound I, the composition ratio among them is not limited. Preferably, the total amount of the dyes selected from the group [A] and/or [B] is 0.1-5 parts by weight per the amount of azo compound I.

Examples of a polymer film usable as the substrate of polarizing film include polyvinyl alcohol; derivatives of polyvinyl alcohol; polyvinyl alcohol modified with an olefin such as ethylene and propylene or with an unsaturated fatty acid such as crotonic acid, acrylic acid, methacrylic acid or maleic acid; EVA (ethylene-vinyl acetate) resin; a saponified EVA resin; a nylon resin; and a polyester resin. A film made of polyvinyl alcohol or derivatives thereof is particularly preferred from the view points of the dye fixation and the orientation.

Incorporation of the dichromatic dye into a polymer film is carried out usually by dyeing the polymer film. The dyeing is, for example, carried out by dipping the polymer film in a dye bath prepared by dissolving the dichromatic dye in water. Though dye concentration in the dye bath is not particularly limited, it is usually in the range from 0.0001 to 10% by weight. If desired, a dyeing auxiliary such as sodium sulfate may be used. Preferably, the concentration of sodium sulfate is from 1 to 10% by weight. Dyeing temperature is preferably from about 40° to about 80° C.

The orientation of the dichromatic dye incorporated in the polymer film is conducted by stretching the film. Stretching the polymer film can be conducted according to a known method such as a wet stretching method or a dry stretching method. The stretching the film may be conducted prior to the dyeing.

If desired, the oriented polymer film containing the dichromatic dyes is subjected to a post-treatment such as a boric acid treatment according to a known manner in order to improve the light transmittance and polarizing activities of the polarizing film. Conditions for the boric acid treatment vary depending on the kinds of the polymer film and the kinds of dichromatic dyes used. Usually, however, the treatment is carried out in an aqueous boric acid solution having the concentration of from 1 to 15% by weight, preferably from 5 to 10% by weight, at a temperature of from 30° to 80° C., preferably from 50° to 75° C. If desired, the polymer film may further be subjected to a fixing treatment in an aqueous solution containing a cationic polymer compound.

The dye-containing polarizing film thus obtained may be laminated with a protective film having excellent optical transparency and mechanical strength on one or both sides of the film to produce a polarizing plate. Conventional materials which have been used for producing protective films for polarizing films can be used in the present invention. Examples of the materials used for producing the protective film include a fluorine type film such as a tetrafluoro ethylene/hexafluoro propylene copolymer film, a polyester resin film, a polyolefin resin film and a polyamide resin film, as well as a cellulose acetate film and an acrylic film which have been conventionally used.

A polarizing film having excellent polarizing activities and durability to moisture and heat can be obtained by incorporating azo compound I to a film substrate. A polarizing film having neutral color which keeps the excellent polarizing activities and durability can be obtained by incorporating another organic dye(s) in addition to azo compound I. Particularly, by incorporating at least two dyes selected from the above-mentioned group [A] and [B] in addition to azo compound I, polarizing films which are little pervious to light at crossed state over the visible wavelength region and which keep the excellent polarizing activities and durability can be obtained. As mentioned above, if a set of two polarizing films of neutral color is pervious to light of a specific wave length within the visible radiation wavelength region at crossed state, a liquid crystal display using the two films often shows a color different from the intended color at dark state. In order to prevent the problem due to the light breaking through the films, transmittance of the polarizing films at crossed state (hereinafter, this is referred to as "cross light transmittance") must be lowered over the visible radiation wavelength region. Being little pervious to light at crossed state over the visible wavelength region means that cross light transmittance is very low over the visible wavelength region. Therefore, by using a polarizing film incorporating at least two dyes selected from the above-mentioned group [A] and [B] in addition to azo compound, the above-mentioned problem of conventional liquid crystal display can be solved.

Azo compound I is useful as a dye, particularly as a dichromatic dye to be incorporated into a dye-containing polarizing film. The dye-containing polarizing film containing azo compound I not only exhibits high polarizing activities but also has excellent durability to moisture and heat. Hence, the polarizing film of the present invention is preferably applied to a variety of liquid crystal displays, particularly to displays for motor vehicles which require high polarizing activities and durability and to displays for industrial instruments used in a variety of circumstances.

The present invention is now explained in more details with reference to the following Examples, which are only illustrative, and never construed to limit the invention. In the examples, "part" and "%" mean "part by weight" and "% by weight" respectively unless otherwise mentioned.

EXAMPLE 1

34.6 Parts of sulfanilic acid was dispersed in 1000 parts of water, and 28% aqueous sodium hydroxide solution was added thereto so as to adjust the pH to 7 and to dissolve the sulfanilic acid. Then, 37.1 parts of 4-nitro benzoylchloride was added in small portions while adjusting the pH to around 7 by adding 28% aqueous sodium hydroxide solution, followed by conducting the reaction for 12 more hours. Thereafter, sodium chloride was added to the reaction mixture for salting out crystalline product, followed by filtering the reaction mixture to obtain the crystalline product.

To 1400 parts of water, 30 parts of iron powder and 5 parts of ferrous sulfate (7hydrate) was added and dispersed. To the resulting dispersion, the crystalline product obtained above was added in small portions, followed by conducting reaction for 7 hours at 85°. After cooling the resulting reaction mixture to 60° C., 28% aqueous sodium hydroxide solution was added thereto to adjust the pH to 10 and the insoluble component was removed by filtration. To the filtrate obtained by the filtration, 35% hydrochloric acid was added to adjust the pH to 7 and, then, sodium chloride was added thereto for salting out crystalline product, followed by filtration to obtain an intermediate (1) having following structure:

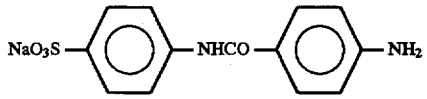

Subsequently, to 150 parts of water, 15.7 parts of the intermediate (1) and 7 parts of 28% aqueous sodium hydroxide solution were added and dissolved. To the resulting solution, 10.9 parts of 35% aqueous sodium nitrite solution was added, followed by adding 26 parts of 35% hydrochloric acid to carry out diazotization at 20°–30° C. After excess sodium nitrite was eliminated by adding sulfamic acid, the resulting solution was added to a solution prepared by adding 5.2 parts of 35% hydrochloric acid and 6.9 parts of 1-amino-2-methoxy-5-methylbenzene to 100 parts of water. Thereafter, sodium carbonate was added thereto to adjust the pH to 3 and with stirring the reaction mass, the coupling reaction was completed, followed by filtering out the precipitated crystalline product to obtain a monoazo compound.

Subsequently, the monoazo compound thus obtained was dispersed in 300 parts of water, then 15.6 parts of 35% hydrochloric acid was added thereto and, then, 10.9 parts of 35% sodium nitrite was added to carry out diazotization with stirring the mixture at 25°–35° C. to obtain a diazotized product of the monoazo compound.

15.8 parts of 1-hydroxynaphthalene-6-phenylamino-3-sulfonic acid was added to 200 parts of water and the pH was adjusted to 8.5 by adding sodium carbonate at 10°–15° C. While keeping the pH of the mixture at 8.5 with the aid of sodium carbonate, the diazotized product of the monoazo compound obtained above was added to the mixture and, then, with stirring the mixture, coupling reaction was completed. Thereafter, salting out with sodium chloride and filtration were conducted to obtain a crystalline product which is a bisazo compound having following structure:

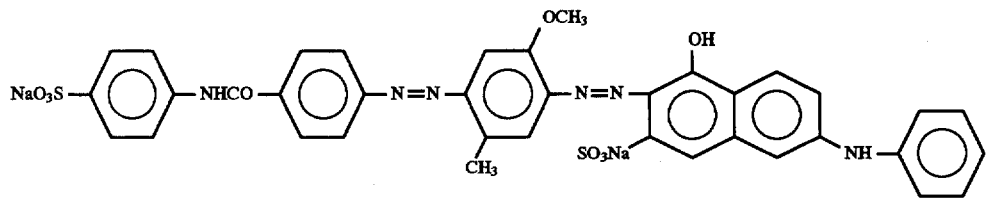

Measured in an aqueous medium, λmax of this compound is 561 nm.

EXAMPLE 2

20 Parts of the bisazo compound obtained in Example 1 was added to 500 parts of water. To the mixture, 6 parts of anhydrous copper sulfate and 8 parts of monoethanol amine were added and, then, the resulting mixture was heated to 95° C. and reaction was carried out for 12 hours at the temperature.

After completion of the reaction, the mixture was cooled to 30° C. and, then, 35% hydrochloric acid was added to adjust the pH to 7, followed by adding sodium chloride for salting out a crystalline product which was then filtered out to obtain a bisazo compound having following structure:

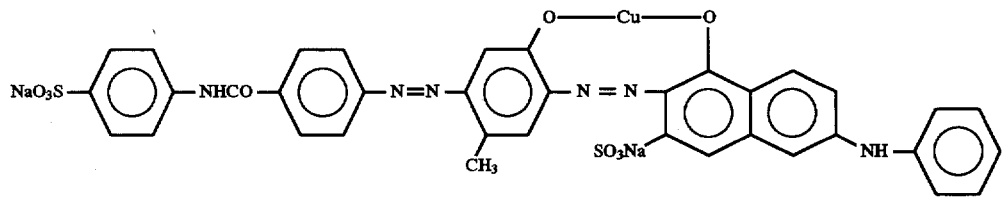

Measured in an aqueous medium, λmax of this compound is 600 nm.

EXAMPLE 3

Example 1 was repeated except that 15.8 parts of 1-hydroxy naphthalene-6-phenylamino-3-sulfonic acid was replaced with 18 parts of 1-hydroxy naphthalene-6-(4-aminobenzoyl)amino-3-sulfonic acid to obtain a bisazo compound having following structure:

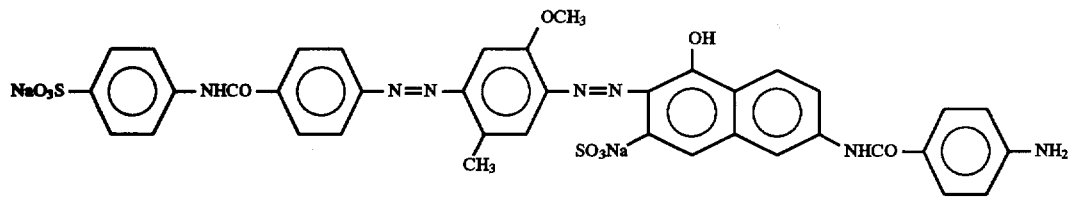

Measured in an aqueous medium, λmax of this compound is 555 nm.

EXAMPLE 4

21 Parts of the bisazo compound obtained in Example 3 was added to 500 parts of water. To the mixture, 6 parts of anhydrous copper sulfate and 8 parts of monoethanol amine were added and, then, the resulting mixture was heated to 95° C. and reaction was carried out for 12 hours at the temperature.

After completion of the reaction, the mixture was cooled to 30° C. and, then, 35% hydrochloric acid was added to adjust the pH to 7, followed by adding sodium chloride for salting out a crystalline product which was then filtered out to obtain a bisazo compound having following structure:

hydrochloric acid was added thereto to adjust pH to 7, followed by adding sodium chloride for salting out crystalline product which was then filtered out to obtain a monoazo compound.

Subsequently, to 150 parts of water, 15.7 parts of the intermediate (1) obtained in Example 1 and 7 parts of 28% aqueous sodium hydroxide solution were added and dissolved. To the resulting solution, 10.9 parts of 35% aqueous sodium nitrite solution was added, followed by adding 26 parts of 35% hydrochloric acid to carry out diazotization at 20°–30° C. After excess sodium nitrite was eliminated by adding sulfamic acid, the resulting solution was added to a solution prepared by adding 5.2 parts of 35% hydrochloric acid and 7.7 parts of 1-amino-2,5-dimethoxybenzene to 100 parts of water. Thereafter, sodium carbonate was added thereto to adjust the pH to 3 and with stirring the reaction

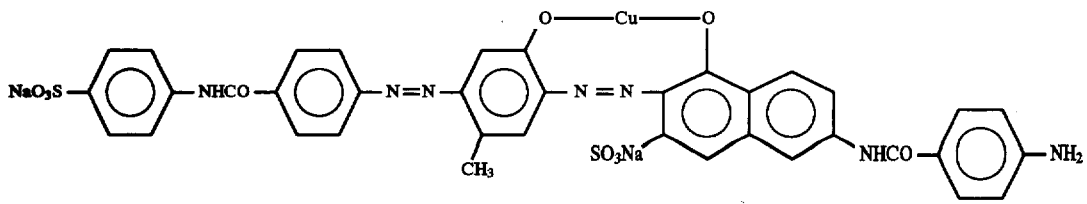

Measured in an aqueous medium, λmax of this compound is 591 nm.

EXAMPLE 5

12 Parts of 6-amino-1-hydroxynaphthalene-3-sulfonic acid was dispersed in 150 parts of water and dissolved by adding 6 parts of sodium hydroxide. After adding 9.6 parts of tosyl chloride, the solution was stirred for 1 hour at 35°–40° C. and, then, cooled to 5° C. by adding ice. After adding 21 parts of 35% hydrochloric acid and 3.5 parts of sodium nitrite to the resulting solution, diazotization was conducted at 5° C. Subsequently, 4.7 parts of phenol was added thereto, then, sodium hydroxide was added to adjust the pH to 9, followed by coupling reaction at 5°–10° C. with stirring the reaction mixture. After completion of the coupling reaction, 3 parts of sodium hydroxide was added and hydrolysis was carried out at 80° C. for 3 hours. After cooling the resulting reaction mixture to 20°–30° C., 35% mass, the coupling reaction was completed, followed by filtering out the precipitated crystalline product.

Subsequently, crystalline product thus obtained was dispersed in 300 parts of water, then 15.6 parts of 35% hydrochloric acid was added thereto and, then, 10.9 parts of 35% sodium nitrite was added to carry out diazotization with stirring the mixture at 25°–35° C. to obtain a diazotized product.

Subsequently, the monoazo compound mentioned above was added to 200 parts of water and the pH was adjusted to 8.5 by adding sodium carbonate at 10°–15° C. While keeping the pH of the mixture at 8.5 with the aid of sodium carbonate, the diazotized product mentioned above was added to the mixture and, then, with stirring the mixture, coupling reaction was completed. Thereafter, salting out with sodium chloride and filtration were conducted to obtain a crystalline product which is a trisazo compound having following structure:

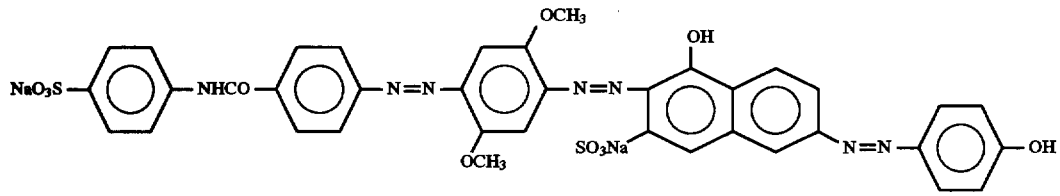

Measured in an aqueous medium, λmax of this compound is 589 nm.

EXAMPLE 6

21 Parts of the trisazo compound obtained in Example 5 was added to 500 parts of water. To the mixture, 6 parts of anhydrous copper sulfate and 8 parts of monoethanol amine were added and, then, the resulting mixture was heated to 95° C. and reaction was carried out for 12 hours at the temperature.

After completion of the reaction, the mixture was cooled 30° C. and, then, 35% hydrochloric acid was added to adjust the pH to 7, followed by adding sodium chloride for salting out a crystalline product which was then filtered to obtain a trisazo compound having following structure:

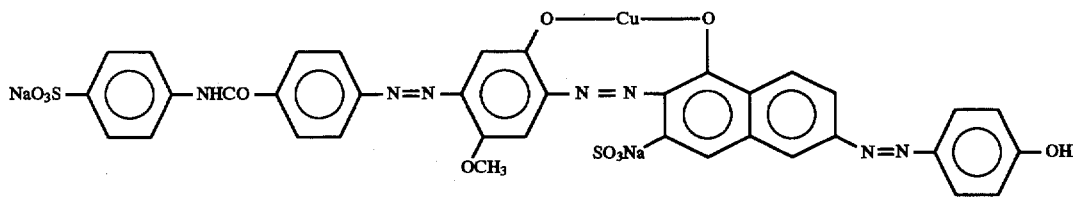

Measured in an aqueous medium, λmax of this compound is 636 nm.

EXAMPLE 7

The trisazo compound obtained in Example 6 was dispersed in 500 parts of water, followed by adding 29 parts of ethylene diamine tetra aceticacid and, then, adding sodium hydroxide to adjust the pH to 5. Thereafter, the mixture was stirred for 3 hours at 30°–40° C., followed by adding sodium chloride for salting out a crystalline product which was then filtered to obtain a trisazo compound having following structure:

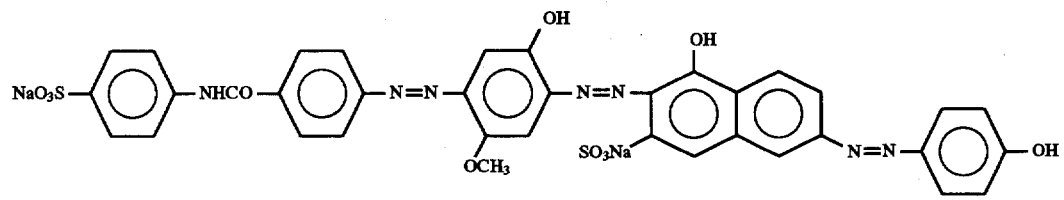

Measured in an aqueous medium, λmax of this compound is 587 nm.

EXAMPLE 8

A polyvinyl alcohol film of 75 μm in thickness (Kuraray Vinylon #7500 manufactured by Kuraray Co., Ltd.) was stretched to four times its original length in a longitudinal uniaxial direction to prepare the substrate of a polarizing film. The resulting film was dipped for 20 minutes, as kept in the tensional state, into a 0.025% aqueous solution of the trisazo compound obtained in Example 7 which further contains sodium sulfate, as a dyeing auxiliary, at a concentration of 2.0% at 65° C. Thereafter, the film was dipped into 7.5% aqueous boric acid solution at 65° C. for 5 minutes, then washed with water at 20° C. for 20 seconds, and then dried at 50° C. to obtain a polarizing film. The polarizing film thus obtained had high polarizing activities and exhibited good durability even after having been left for a long period of time at a high temperature under a highly humid condition.

λmax of the polarizing film is 600 nm.

EXAMPLE 9

Example 8 was repeated, except that the trisazo compound used in Example 8 was replaced with each of the azo compound obtained in Example 1–6. λmax of the polarizing films are shown in the following Table.

TABLE 1

| Azo compound (Example No.) | λmax. (nm) |
|---|---|
| Example 1 | 580 |
| Example 2 | 620 |
| Example 3 | 550 |
| Example 4 | 600 |
| Example 5 | 600 |
| Example 6 | 650 |

Example 10

Example 8 was repeated, except that the trisazo compound used in Example 8 was replaced with each of the azo compound shown in the second column of the following Tables 2–5, which were obtained according to similar methods as in Examples 1–7, to obtain polarizing films. λmax of each of the polarizing film are shown in the third column of the Tables 2–5. The polarizing films obtained had high polarizing activities and exhibited good durability at a high temperature under a highly humid condition.

TABLE 2

| No. | Chemical Structure | λmax (nm) |
|---|---|---|
| 1 | NaO₃S—⟨C₆H₄⟩—NHCO—⟨C₆H₄⟩—N=N—⟨C₆H₂(OCH₃)₂⟩—N=N—[naphthalene(OH)(SO₃Na)]—N=N—⟨C₆H₄⟩—NH₂ | 600 |
| 2 | NaO₃S—⟨C₆H₄⟩—NHCO—⟨C₆H₄⟩—N=N—⟨C₆H₂(OCH₃)₂⟩—N=N—[naphthalene(O—Cu—O)(SO₃Na)]—N=N—⟨C₆H₄⟩—NH₂ | 650 |
| 3 | NaO₃S—⟨C₆H₄⟩—NHCO—⟨C₆H₄⟩—N=N—⟨C₆H₂(OCH₃)₂⟩—N=N—[naphthalene(OH)(SO₃Na)]—NHCO—⟨C₆H₄⟩—NH₂ | 580 |
| 4 | NaO₃S—⟨C₆H₄⟩—NHCO—⟨C₆H₄⟩—N=N—⟨C₆H₃(OCH₃)⟩—N=N—[naphthalene(O—Cu—O)(SO₃Na)]—NHCO—⟨C₆H₄⟩—NH₂ | 630 |
| 5 | NaO₃S—⟨C₆H₄⟩—NHCO—⟨C₆H₄⟩—N=N—⟨C₆H₂(OCH₃)(CH₃)⟩—N=N—[naphthalene(OH)(SO₃Na)]—N=N—⟨C₆H₄⟩—NH₂ | 570 |
| 6 | NaO₃S—⟨C₆H₄⟩—NHCO—⟨C₆H₄⟩—N=N—⟨C₆H₂(CH₃)⟩—N=N—[naphthalene(O—Cu—O)(SO₃Na)]—N=N—⟨C₆H₄⟩—NH₂ | 610 |

TABLE 3

| No. | Chemical Structure | λmax (nm) |
|---|---|---|
| 7 | NaO₃S—⟨C₆H₄⟩—NHCO—⟨C₆H₄⟩—N=N—⟨C₆H₂(OC₂H₅)₂⟩—N=N—[naphthalene(OH)(SO₃Na)]—N=N—⟨C₆H₄⟩—OH | 600 |
| 8 | NaO₃S—⟨C₆H₄⟩—NHCO—⟨C₆H₄⟩—N=N—⟨C₆H₂(NHCOCH₃)⟩—N=N—[naphthalene(O—Cu—O)(SO₃Na)]—N=N—⟨C₆H₄⟩—OH | 640 |
| 9 | ⟨C₆H₄(OCH₃)⟩—NHCO—⟨C₆H₄⟩—N=N—⟨C₆H₂(OCH₃)₂⟩—N=N—[naphthalene(OCH₃)(SO₃Na)]—N=N—⟨C₆H₂(SO₃Na)(NH₂)₂⟩ | 600 |

TABLE 3-continued

| No. | Chemical Structure | λmax (nm) |
|---|---|---|
| 10 | NaOOC—C₆H₄—NHCO—C₆H₄—N=N—C₆H₂(OCH₃)₂—N=N—naphthyl(OH)(SO₃Na)—N=N—C₆H₃(OH)(COOH) | 600 |
| 11 | (SO₃Na)₂-naphthyl—NHCO—C₆H₄—N=N—C₆H₂(O—Cu—O)(OCH₃)—N=N—naphthyl(SO₃Na)—N=N—C₆H₄—OH | 650 |
| 12 | NaO₃S—C₆H₄—NHCO—C₆H₄—N=N—C₆H₂(OCH₃)₂—N=N—naphthyl(OH)(SO₃Na)—NH—C₆H₅ | 590 |
| 13 | NaO₃S—C₆H₄—NHCO—C₆H₄—N=N—C₆H₂(O—Cu—O)(OCH₃)—N=N—naphthyl(SO₃Na)—NH—C₆H₅ | 640 |

TABLE 4

| No. | Chemical Structure | λmax (nm) |
|---|---|---|
| 14 | NaO₃S—C₆H₄—NHCO—C₆H₄—N=N—C₆H₃(O—Cu—O)—N=N—naphthyl(SO₃Na)—NH—C₆H₅ | 590 |
| 15 | NaO₃S—C₆H₄—NHCO—C₆H₄—N=N—C₆H₂(OCH₃)₂—N=N—naphthyl(OH)(SO₃Na)—N=N—C₆H₃(OH)(N(C₂H₅)₂) | 610 |
| 16 | NaO₃S—C₆H₄—NHCO—C₆H₄—N=N—C₆H₂(OCH₃)₂—N=N—naphthyl(OH)(SO₃Na)—N=N—C₆H₃(OCH₃)(CH₃)(NH₂) | 610 |
| 17 | NaO₃S—C₆H₄—NHCO—C₆H₃(OCH₃)—N=N—C₆H₂(OCH₃)₂—N=N—naphthyl(OH)(SO₃Na)—N=N—C₆H₄—OH | 610 |

TABLE 4-continued

| No. | Chemical Structure | λmax (nm) |
|---|---|---|
| 18 | NaO₃S—⟨○⟩—NHCO—⟨○⟩(CH₃)—N=N—⟨○⟩(OCH₃, OCH₃)—N=N—[naphthalene: OH, SO₃Na]—N=N—⟨○⟩—OH | 600 |
| 19 | NaO₃S—⟨○⟩—NHCO—⟨○⟩(CH₃, CH₃)—N=N—⟨○⟩(OCH₃, OCH₃)—N=N—[naphthalene: OH, SO₃Na]—N=N—⟨○⟩—OH | 610 |
| 20 | CH₃—⟨○⟩—NHCO—⟨○⟩—N=N—⟨○⟩(OCH₃, OCH₃)—N=N—[naphthalene: OCH₃, SO₃Na]—N=N—⟨○⟩(SO₃Na, NH₂, NH₂) | 600 |

TABLE 5

| No. | Chemical Structure | λmax (nm) |
|---|---|---|
| 21 | NaO₃S—⟨○⟩—NHCO—⟨○⟩—N=N—⟨○⟩(OCH₃, H₃CO)—N=N—[naphthalene: OH, NaO₃S]—N=N—⟨○⟩—OH | 600 |
| 22 | NaO₃S—⟨○⟩—NHCO—⟨○⟩—N=N—⟨○⟩(O—Cu—O, H₃CO)—N=N—[naphthalene: NaO₃S]—N=N—⟨○⟩—OH | 650 |
| 23 | NaO₃S—⟨○⟩—NHCO—⟨○⟩—N=N—⟨○⟩(OCH₃, H₃CO)—N=N—[naphthalene: OH, NaO₃S]—NHCO—⟨○⟩—OH | 580 |
| 24 | NaO₃S—⟨○⟩—NHCO—⟨○⟩—N=N—⟨○⟩(O—Cu—O, H₃CO)—N=N—[naphthalene: NaO₃S]—NHCO—⟨○⟩—OH | 630 |

EXAMPLE 11

A polyvinyl alcohol film of 75 μm in thickness (Kuraray Vinylon Film VF-9X75RS manufactured by Kuraray Co., Ltd.) was stretched to four times of its original length in a longitudinal uniaxial direction to prepare the substrate of a polarizing film. As kept in the tensioned state, the resulting film was dipped into aqueous solution of sodium salt of azo compound No. 4 in Table 2 used in Example 10, sodium salt of azo compound of formula(IIIa-1), C.I. direct orange 39 and sodium sulfate(=dyeing auxiliary), the concentrations of the solutes being 0.025%, 0.0017%, 0.0014% and 2.0%, respectively, at 70° C. for 27 minutes.

Thereafter, the film was dipped into 7.5% aqueous boric acid solution at 78° C. for 5 minutes and then washed with 20° C. water for 30 seconds to obtain a polarizing film. The polarizing film thus obtained has a neutral color and no discoloration was observed even after having been kept for a long period of time at a high temperature under a highly humid condition.

EXAMPLE 12

A polyvinyl alcohol film of 75 μm in thickness (Kuraray Vinylon Film VF-9X75RS manufactured by Kuraray Co., Ltd.) was stretched to four times its original length in a longitudinal uniaxial direction to prepare the substrate of a polarizing film. As kept in the tensioned state, the resulting film was dipped into aqueous solution of sodium salt of azo compound No. 24 in Table 5 used in Example 10, sodium salt of azo compound of formula(IIIa-1), C.I. direct orange 39 and sodium sulfate(=dyeing auxiliary), the concentrations of the solutes being 0.025%, 0.0023%, 0.0028% and 2.0%, respectively, at 70° C. for 18 minutes.

Thereafter, the film was dipped into 7.5% aqueous boric acid solution at 78° C. for 5 minutes and then washed with 20° C. water for 30 seconds to obtain a polarizing film. The polarizing film thus obtained has a neutral color and no discoloration was observed even after having been kept for a long period of time at a high temperature under a highly humid condition.

EXAMPLE 13

A polyvinyl alcohol film of 75 μm in thickness (Kuraray Vinylon Film VF-9X75RS manufactured by Kuraray Co., Ltd.) was stretched to four times its original length in a longitudinal uniaxial direction to prepare the substrate of a polarizing film. As kept in the tensioned state, the resulting film was dipped into aqueous solution of sodium salt of azo compound No. 4 in Table 2 used in Example 10, sodium salt of azo compound of formula(IIIa-6), C.I. direct orange 39 and sodium sulfate(=dyeing auxiliary), the concentrations of the solutes being 0.025%, 0.0012%, 0.0013% and 2.0%, respectively, at 70° C. for 30 minutes.

Thereafter, the film was dipped into 7.5% aqueous boric acid solution at 78° C. for 5 minutes and then washed with 20° C. water for 30 seconds to obtain a polarizing film. The polarizing film thus obtained has a neutral color and no discoloration was observed even after having been kept for a long period of time at a high temperature under a highly humid condition.

EXAMPLE 14

A polyvinyl alcohol film of 75 μm in thickness (Kuraray Vinylon Film VF-9X75RS manufactured by Kuraray Co., Ltd.) was stretched to four times its original length in a longitudinal uniaxial direction to prepare the substrate of a polarizing film. As kept in the tensioned state, the resulting film was dipped into aqueous solution of sodium salt of azo compound No. 24 in Table 5 used in Example 10, sodium salt of azo compound of formula(IIIa-6), C.I. direct orange 39 and sodium sulfate(=dyeing auxiliary), the concentrations of the solutes being 0,025%, 0,001%, 0.0018% and 2.0%, respectively, at 70° C. for 30 minutes.

Thereafter, the film was dipped into 7.5% aqueous boric acid solution at 78° C. for 5 minutes and then washed with 20° C. water for 30 seconds to obtain a polarizing film. The polarizing film thus obtained has a neutral color and no discoloration was observed even after having been kept for a long period of time at a high temperature under a highly humid condition.

EXAMPLE 15

According to similar conditions as in Example 11 except that azo compound of formula(IIIa-1) was replaced by the compound obtained in Example 3 to obtain a polarizing film. The polarizing film thus obtained has excellent properties.

EXAMPLE 16

According to similar conditions as in Example 11 except that azo compound No. 4 in Table 2 used in Example 10 and azo compound of formula(IIIa-1) were replaced by azo compound No. 22 in Table 5 used in Example 10 and C.I. direct red 81 to obtain a polarizing film. The polarizing film thus obtained has excellent properties.

EXAMPLE 17

According to similar conditions as in Example 11 except that azo compound No. 4 in Table 2 used in Example 10 and C.I. direct orange 39 were replaced by azo compound No. 24 in Table 5 used in Example 10 and C.I. direct orange 107 to obtain a polarizing film. The polarizing film thus obtained has excellent properties.

What we claim is:

1. An azo compound represented by the following formulae (II):

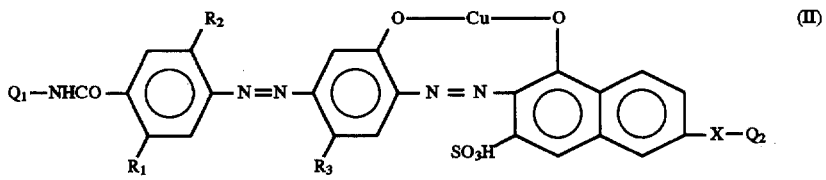

wherein $Q_1$ represents a substituted or unsubstituted phenyl group or a substituted or unsubstituted naphthyl group, $Q_2$ represents a substituted or unsubstituted phenyl group; $R_1$ and $R_2$ each independently represent a hydrogen atom, a hydroxy group, a $C_1-C_4$ alkyl group, a $C_1-C_4$ alkoxy group or a halogen atom; $R_3$ is a hydrogen atom, a hydroxy group, a $C_1-C_4$ alkyl group, a $C_1-C_4$ alkoxy group or a substituted amino group; and X represents —NH—, —NHCO— or —N=N—; or a salt thereof.

2. An azo compound according to claim 1 wherein $Q_1$ is a phenyl group represented by the following formula:

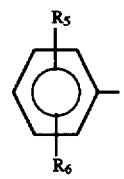

wherein $R_5$ and $R_6$ each independently represent a hydrogen atom, a sulfo group, a sulfamoyl group, a $C_1-C_4$ alkyl group, a $C_1-C_4$ alkoxy group, a substituted amino group, a carboxy group or a halogen atom.

3. An azo compound according to claim 1 wherein $Q_1$ is a naphthyl group represented by the following formula:

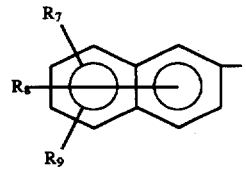

wherein $R_7$, $R_8$ and $R_9$ each independently represent a hydrogen atom, a hydroxy group or a sulfo group.

4. An azo compound according to claim 1 wherein X is —N=N— and $Q_2$ is a phenyl group which is substituted once, twice or three times by hydroxy groups and which may be further substituted by an unsubstituted amino group, a substituted amino group, a sulfo group, a $C_1$–$C_4$ alkyl group, a $C_1$–$C_4$ alkoxy group or a carboxy group.

5. An azo compound according to claim 1 wherein X is —N=N— and $Q_2$ is a phenyl group which is substituted once or twice by unsubstituted or substituted amino groups, and which may be further substituted by one or two substituents selected from a hydroxy group, a sulfo group, a $C_1$–$C_4$ alkyl group, a $C_1$–$C_4$ alkoxy group or a carboxy group.

6. An azo compound according to claim 4 wherein X is —N=N— and $Q_2$ is 4-hydroxyphenyl.

7. An azo compound according to claim 1 wherein X is —NHCO— or —NH— and $Q_2$ is an unsubstituted phenyl group or a phenyl group substituted by a hydroxy group, an unsubstituted amino group, a substituted amino group, a sulfo group or a $C_1$–$C_4$ alkoxy group.

8. An azo compound according to claim 1 wherein $R_1$ and $R_2$ each independently represent a hydrogen atom, a methyl group, a methoxy group, a hydroxy group and a chlorine atom.

9. An azo compound according to claim 1 wherein $R_3$ is a hydrogen atom, a hydroxy group, a methyl group, an ethyl group, a methoxy group, an ethoxy group or an acetylamino group.

10. A polarizing film which comprises an azo compound of formula (II) or a salt thereof according to claim 1 and a polarizing film substrate.

11. A polarizing film according to claim 10 which further comprises one or more further organic dyes other than an azo compound of formula (II) or a salt thereof according to claim 1 in a polarizing film substrate.

12. A polarizing film according to claim 11 wherein the further organic dyes are at least two dyes selected from the following group [A] and [B]:

[A] trisazo dyes represented by the following formula (IIIa) or (IIIb):

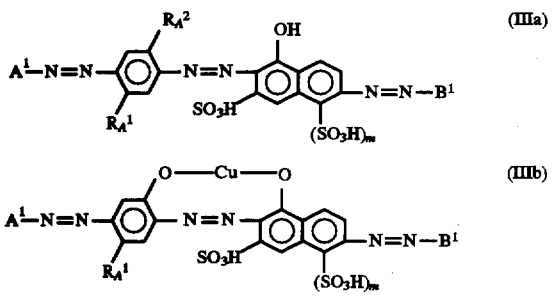

wherein $A^1$ and $B^1$, which are the same or different, each represent a substituted or unsubstituted phenyl group or a substituted or unsubstituted naphthyl group; $R_A^1$ represents a substituted amino group, a hydrogen atom, a $C_1$–$C_4$ alkyl group or a $C_1$–$C_4$ alkoxy group; $R_A^2$ represents a hydrogen atom, a hydroxy group or a $C_1$–$C_4$ alkoxy group; and m is 0 or 1; and salts thereof;

[B] C.I. Direct Yellow 12, C.I. Direct Yellow 28, C.I. Direct Yellow 44, C.I. Direct Orange 26, C.I. Direct Orange 39, C.I. Direct Orange 107, C.I. Direct Red 2, C.I. Direct Red 31, C.I. Direct Red 79, C.I. Direct Red 81 and C.I. Direct Red 247.

13. A polarizing film according to claim 12 wherein the further organic dyes are at least one dye selected from the group [A] and at least one dye selected from the group [B].

14. A polarizing film according to claim 10 wherein the polarizing film substrate comprises polyvinyl alcohol or a derivative thereof.

15. An azo compound represented by the following formulae (I) or (II):

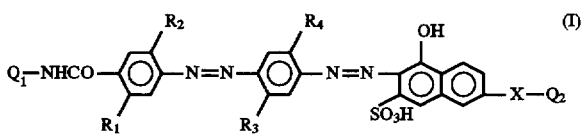

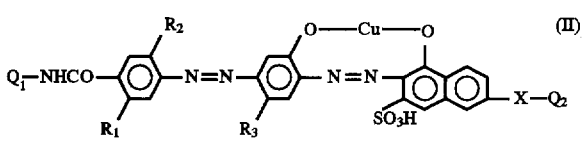

wherein $Q_1$ represents a substituted or unsubstituted phenyl group or a substituted or unsubstituted naphthyl group, $Q_2$ represents a substituted or unsubstituted phenyl group; $R_1$ and $R_2$ each independently represent a hydrogen atom, a hydroxy group, a $C_1$–$C_4$ alkyl group, a $C_1$–$C_4$ alkoxy group or a halogen atom; $R_3$ and $R_4$ each independently represent a hydrogen atom, a hydroxy group, a $C_1$–$C_4$ alkyl group, a $C_1$–$C_4$ alkoxy group or a substituted amino group; and X represents —N=N—; or a salt thereof.

16. A polarizing film which comprises an azo compound of formula (I) or (II) or a salt thereof according to claim 15 and a polarizing film substrate.

17. A polarizing film according to claim 16 which further comprises one or more further organic dyes other than an azo compound of formula (I) or (II) or a salt as defined herein in a polarizing film substrate.

18. A polarizing film according to claim 16 wherein the polarizing film substrate comprises polyvinyl alcohol or a derivative thereof.

19. A polarizing film according to claim 17 wherein the further organic dyes are at least two dyes selected from the following group [A] and [B]:

[A] trisazo dyes represented by the following formula (IIIa) or (IIIb):

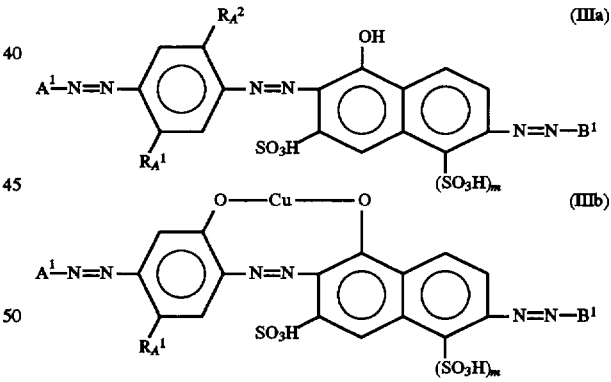

wherein $A^1$ and $B^1$, which are the same or different, each represent a substituted or unsubstituted phenyl group or a substituted or unsubstituted naphthyl group; $R_A^1$ represents a substituted amino group, a hydrogen atom, a $C_1$–$C_4$ alkyl group or a $C_1$–$C_4$ alkoxy group;

$R_A^2$ represents a hydrogen atom, a hydroxy group or a $C_1$–$C_4$ alkoxy group; and m is 0 or 1; and salts thereof;

[B] C.I. Direct Yellow 12, C.I. Direct Yellow 28, C.I. Direct Yellow 44, C.I. Direct Orange 26, C.I. Direct Orange 39, C.I. Direct Orange 107, C.I. Direct Red 2, C.I. Direct Red 31, C.I. Direct Red 79, C.I. Direct Red 81 and C.I. Direct Red 247.

20. A polarizing film according to claim 19 wherein the further organic dyes are at least one dye selected from the group [A] and at least one dye selected from the group [B].

21. An azo compound represented by the following formulae (I) or (II):

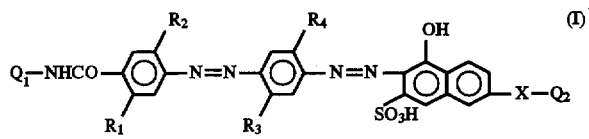

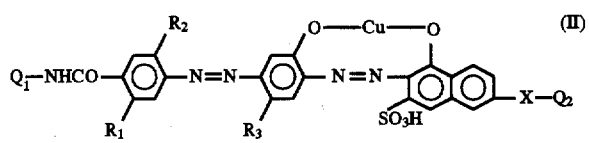

wherein $Q_1$ is a phenyl group represented by the following formula:

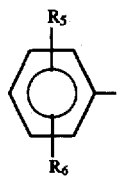

wherein $R_5$ and $R_6$ each independently represent a hydrogen atom, a sulfo group, a sulfamoyl group, a $C_1-C_4$ alkyl group, a $C_1-C_4$ alkoxy group, a substituted amino group, a carboxy group or a halogen atom, or a naphthyl group represented by the following formula:

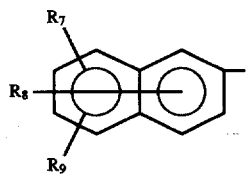

wherein $R_7$, $R_8$ and $R_9$ each independently represent a hydrogen atom, a hydroxy group or a sulfo group;
$Q_2$ represents a substituted or unsubstituted phenyl group; $R_1$ and $R_2$ each independently represent a hydrogen atom, a hydroxy group, a $C_1-C_4$ alkyl group, a $C_1-C_4$ alkoxy group or a halogen atom; $R_3$ and $R_4$ each independently represent a hydrogen atom, a hydroxy group, a $C_1-C_4$ alkyl group, a $C_1-C_4$ alkoxy group or a substituted amino group and X represents —NH—, —NHCO— or —N=N—; or a salt thereof.

22. A polarizing film which comprises an azo compound of formula (I) or (II) or a salt thereof according to claim 21 and a polarizing film substrate.

23. A polarizing film according to claim 22 which further comprises one or more further organic dyes other than an azo compound of formula (I) or (II) or a salt as defined herein in a polarizing film substrate.

24. A polarizing film according to claim 23 wherein the further organic dyes are at least two dyes selected from the following group [A] and [B]:

[A] trisazo dyes represented by the following formula (IIIa) or (IIIb):

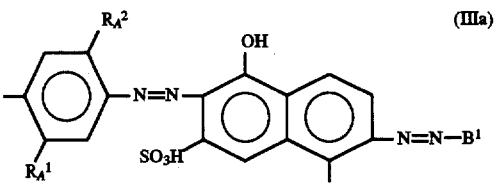

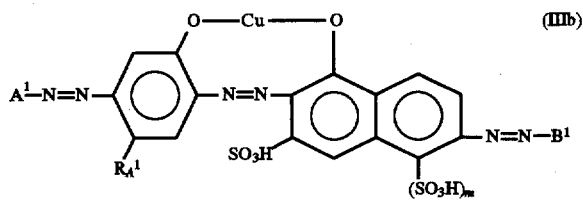

wherein $A^1$ and $B^1$, which are the same or different, each represent a substituted or unsubstituted phenyl group or a substituted or unsubstituted naphthyl group; $R_A^1$ represents a substituted amino group, a hydrogen atom, a $C_1-C_4$ alkyl group or a $C_1-C_4$ alkoxyl group; $R_A^2$ represents a hydrogen atom, a hydroxy group or a $C_1-C_4$ alkoxy group; and m is 0 or 1; and salts thereof;

[B] C.I. Direct Yellow 12, C.I. Direct Yellow 28, C.I. Direct Yellow 44, C.I. Direct Orange 26, C.I. Direct Orange 39, C.I. Direct Orange 107, C.I. Direct Red 2, C.I. Direct Red 31, C.I. Direct Red 79, C.I. Direct Red 81 and C.I. Direct Red 247.

25. A polarizing film according to claim 24 wherein the further organic dyes are at least one dye selected from the group [A] and at least one dye selected from the group [B].

26. A polarizing film according to claim 22 wherein the polarizing substrate comprises polyvinyl alcohol or a derivative thereof.

* * * * *